US007268780B2

(12) United States Patent
Shibano

(10) Patent No.: US 7,268,780 B2
(45) Date of Patent: Sep. 11, 2007

(54) SIMULATION METHOD, PROGRAM, AND SYSTEM FOR CREATING A VIRTUAL THREE-DIMENSIONAL ILLUMINATED SCENE

(75) Inventor: Nobuyuki Shibano, Amagasaki (JP)

(73) Assignee: Matsushita Electric Works, Ltd., Osaka (JP)

( * ) Notice: Subject to any disclaimer, the term of this patent is extended or adjusted under 35 U.S.C. 154(b) by 361 days.

(21) Appl. No.: 10/528,470

(22) PCT Filed: Mar. 25, 2004

(86) PCT No.: PCT/JP2004/004234

§ 371 (c)(1),
(2), (4) Date: Mar. 21, 2005

(87) PCT Pub. No.: WO2004/086824

PCT Pub. Date: Oct. 7, 2004

(65) Prior Publication Data

US 2006/0007228 A1 Jan. 12, 2006

(30) Foreign Application Priority Data

Mar. 26, 2003 (JP) ............................ 2003-085577

(51) Int. Cl.
*G06T 15/50* (2006.01)

(52) U.S. Cl. ......................... 345/426; 700/17; 715/700

(58) Field of Classification Search ..................... None
See application file for complete search history.

(56) References Cited

U.S. PATENT DOCUMENTS 3,898,643 A * 8/1975 Ettlinger ...................... 700/84

(Continued)

FOREIGN PATENT DOCUMENTS

EP 0 495 305 A2 7/1992

(Continued)

OTHER PUBLICATIONS

PCT International Search Report for PCT/JP2004/004234 mailed on Aug. 17, 2004.

(Continued)

*Primary Examiner*—Ulka J. Chauhan
*Assistant Examiner*—Peter-Anthony Pappas
(74) *Attorney, Agent, or Firm*—Rader, Fishman & Grauer PLLC

(57) ABSTRACT

A rapid simulation is made to create an illuminated scene of object with a simplified arithmetic of calculating an intended color change effect. The object illuminated with lighting fixtures are divided into discrete elements each having a lamp-by-element table defining lamp color component values of each of the influencing lighting fixtures. In accordance with the changes in the output characteristic and/or the position of the lighting fixture, it is determined which one or ones of the discrete elements are influenced by the changes. Then, the lamp-by-element tables only associated with thus determined elements are picked up in order to modify the color component values as a function of the changing output characteristic and the position of the influencing lighting fixture. The resulting color components at each discrete element are then processed to provide a color distribution over the array of the elements for rendering the view of the illuminated scene.

9 Claims, 8 Drawing Sheets

U.S. PATENT DOCUMENTS 5,307,295 A * 4/1994 Taylor et al. .................. 703/1
5,406,176 A * 4/1995 Sugden ....................... 315/292
5,488,700 A * 1/1996 Glassner ..................... 345/426
5,867,166 A 2/1999 Myhrvold et al.
6,118,453 A * 9/2000 Suzuki et al. ............... 345/426

FOREIGN PATENT DOCUMENTS

WO WO-02/101702 A2 12/2002
WO WO-03/015477 A1 2/2003

OTHER PUBLICATIONS

"Martin ShowDesigner (MSD 4.2)", Sep. 2000, Martin Professional A/S, Aarhus, Denmark, XP002283788.
Autodesk White Paper: "Lightscape 3.2: Concepts and Techniques in Computer Generated Lighting Simulation" 2001, Autodesk Inc., San Rafael, CA, USA, XP002287389.

* cited by examiner

36

| LAMP-BY-ELEMENT TABLE | | | |
|---|---|---|---|
| E(Xn, Yn) | | | |
| LAMP | R | G | B |
| 001 | 0.745 | 0.549 | 0.086 |
| 002 | 0.227 | 0.072 | 0.752 |
| | | | |
| ... | | | |
| SUM | 0.972 | 0.621 | 0.838 |

36

| LAMP-BY-ELEMENT TABLE | | | |
|---|---|---|---|
| E(Xn+2, Yn-1) | | | |
| LAMP | R | G | B |
| 001 | 0.628 | 0.487 | 0.024 |
| 003 | 0.325 | 0.102 | 0.080 |
| | | | |
| ... | | | |
| SUM | 0.953 | 0.589 | 0.104 |

*FIG. 6*

32

| OBJECT INFO TABLE | | | | |
|---|---|---|---|---|
| ELEMENT | R | G | B | COORDINATES |
| 000001 | 0.044 | 0.052 | 0.086 | 0001, 0001 |
| 000002 | 0.024 | 0.072 | 0.034 | .... |
| | | | | .... |
| | | | | .... |
| 010011 | 0.021 | 0.014 | 0.025 | .... |

34

| LAMP OUTPUT CHARACTERISTIC DATA TABLE | | | | | | | | |
|---|---|---|---|---|---|---|---|---|
| LAMP | R | G | B | S(0,0) | S(0,10) | S(0,20) | ... | S(90,180) |
| 001 | 0.745 | 0.549 | 0.086 | 80 | 75 | 68 | ... | 20 |
| 002 | 0.227 | 0.072 | 0.752 | 58 | 42 | 35 | ... | 30 |
| ... | ... | | | ... | ... | ... | ... | |
| 099 | 0.862 | 0.392 | 0.196 | 74 | 69 | 62 | | 41 |

| LAMP-BY-ELEMENT TABLE | | | |
|---|---|---|---|
| LAMP | R | G | B |
| 001 | 0.745 | 0.549 | 0.086 |
| 002 | 0.227 | 0.072 | 0.752 |
| | | | |
| | | | |
| ... | | | |
| SUM | 0.972 | 0.621 | 0.838 |

36

SIMULATION METHOD, PROGRAM, AND SYSTEM FOR CREATING A VIRTUAL THREE-DIMENSIONAL ILLUMINATED SCENE

TECHNICAL FIELD

The present invention is directed to a simulation method, a simulation program, and a simulation system for creating a virtual three-dimensional scene illuminated with one or more lighting fixture, and more particularly for realizing reproduction of dynamic image of the varying illuminated scene.

BACKGROUND ART

There have been proposed methods for simulating a three-dimensional illuminated scene with moving lighting fixtures. Typical methods are radiosity technique and lay-trace technique both of which rely upon considerably complex arithmetic and therefore suffer from a delay in reproducing the illuminated scene, particularly with the use of a readily-available computing equipment. Because of this insufficiency, the above methods are practically limited to the reproduction of one still image of the illuminated scene, and are not well adapted for reproduction of dynamic image of the varying illuminated scene.

DISCLOSURE OF THE INVENTION

In view of the above problem, the present invention has been accomplished to provide a unique method, program, and system for simulating a virtual three-dimensional illuminated scene which is capable of rapidly reproducing the-varying illuminated scene. The simulation method of the present invention is provided to create the virtual three-dimensional scene illuminated at least one lighting fixture, and includes the steps of obtaining an object data with regard to a three-dimensional object to be illuminated with the lighting fixture, and specifying the lighting fixture and determining a position of the lighting fixture within a space of the three-dimensional object, in order to obtain output characteristic data as well as positional data of the lighting fixture. The object data is then transformed into an array of discrete elements to obtain object color component values inherent to each discrete element. The object color component values are assigned respectively to color components in a predetermined color space for designating the color of each discrete element. The object data is processed together with the output characteristic data and the positional data of the lighting fixture to obtain lamp color component values given to each of the discrete elements. The lamp component values are assigned respectively to the color components in the color space for designating the color of the lighting fixture illuminating each destined discrete element. Based upon the above processing, there are formed a plurality of lamp-by-element tables each being associated with each of the discrete elements, and storing the lamp color component values given to each corresponding one of the discrete elements. Then, the method goes to vary at least one of the output characteristic data and the positional data of the lighting fixture, and to re-calculate the lamp color component values given from the lighting fixture in order to obtain an updated color distribution. The updated color distribution is processed for rendering a view of the three-dimensional scene of the object.

The novel feature of the present invention resides in that the above re-calculation includes the steps of determining the discrete elements to be illuminated by the lighting fixture varying its output characteristic data and/or its positional data, referring the lamp-by-element tables only associated with thus determined discrete elements and modifying the lamp color component values stored in the referred lamp-by-element tables as a function of the output characteristic data and the positional data being varied, and allocating the modified color component values to each of the corresponding discrete elements and combining the modified color component values to the object color component values of each discrete element, thereby realizing the updated color distribution over the entire array of the discrete elements.

Thus, the re-calculation of the lamp color component values can be only limited to the discrete elements being determined to be influenced by the change in the output characteristic and/or the position of the lighting fixture, which greatly reduces the calculation load and therefore enables to rapidly reproducing the lighting effect in prompt response to the varying output characteristic and/or the position of the lighting fixture. Accordingly, it is readily possible to simulate the continuously-changing illuminated scene of the object as a dynamic image.

In a preferred embodiment, two or more lighting fixtures are selected and specified with respect to the output-characteristic data as well as the positional data. In this instance, two or more the lighting fixtures are selected as variable components, and are varied in at least one of the output characteristic data and the positional data to determine the discrete elements to be illuminated by the lighting fixtures selected as the variable components. Then, reference is made to the lamp-by-element tables only associated with thus determined discrete elements in order to modify the lamp color component values stored in the referred lamp-by-element tables. Thereafter, it is made to sum the lamp color component values in each of the referred lamp-by-element tables to give summed lamp color component values associated to each discrete element, and allocating the summed lamp color component values to the discrete elements, thereby realizing the updated color distribution over the array of the discrete elements.

The present invention also provides a simulation program for achieving the above method. The program is to be stored in a recordable medium for execution a computer and includes an input module which provides an input interface for entry of the object data with regard to the three-dimensional object to be illuminated with the lighting fixtures, a lamp setting module which provides a lamp setting interface for selecting one or more of the lighting fixtures and determining position of the selected lighting fixtures within the space of the three-dimensional object, and a lighting data processing module which gives output characteristic data and positional data of the selected lighting fixtures in response to the selection of the lighting fixture and the position thereof received at the lamp setting interface. An object processing module is included to transform the object data into an array of discrete elements, and to obtain object color component values inherent to each discrete element. Also a reference data generating module is included to calculate the object data, and the output characteristic data as well as the positional data of each of the selected lighting fixtures in order to obtain lamp color component values given to each of the discrete elements, and to provide a plurality of lamp-by-element tables each corresponding to each one of the discrete elements and storing the lamp color component values. The lamp-by-element tables are located in a memory to be referred to thereafter. Further, the program includes a lighting control module which provides a lighting control interface for selecting at least one of the lighting fixtures and for selecting changes in at least one of the output characteristic data and the positional data of the lighting fixture. A re-calculation module is given to determine the discrete elements to be illuminated by the lighting fixture, and to refer to the lamp-by-element tables only associated with thus determined discrete elements. The re-calculation module modifies the lamp color component values stored in the referred lamp-element tables as a function of the output characteristic data and the positional data being varied. Also included in the program is a color allocating module which allocates the modified color component values to each corresponding one of the discrete elements and combines the modified color component values to the object color component values of each discrete element to thereby realize the updated color distribution over the entire array of the discrete elements. Further, an image producing module is included to process the updated color distribution for rendering the view of the three-dimensional illuminated scene of the object, and generating a image signal for presenting the view on a display.

The present invention further provides a simulation system for accomplishing the above method. The system is realized by a computer with an input device and the display, and includes an input interface for entry of an object data with regard to the three-dimensional object, a lamp setting interface for selecting one or more the lighting fixtures and for determining position of the selected lighting fixture, and a lighting data processing unit which gives output characteristic data and positional data of the selected lighting fixture in response to the selection of the lighting fixture and the position thereof. An object processing unit is provided to transform the object data into an array of discrete elements, and to obtain object color component values inherent to each discrete element. Also included in the system is a reference data generating unit which calculates the object data, and the output characteristic data as well as the positional data of each of the selected lighting fixtures in order to obtain lamp color component values given to each of the discrete elements, and to provide a plurality of lamp-by-element tables each corresponding to each one of the discrete elements and storing the lamp color component values. The system includes a lighting control interface for selecting at least one of the lighting fixtures and for selecting changes in at least one of the output characteristic data and the positional data of the lighting fixture.

A re-calculation unit is included to determine the discrete elements to be illuminated by the lighting fixture, to refer to the lamp-by-element tables only associated with the determined discrete elements. Then, the re-calculation unit modifies the lamp color component values stored in the referred lamp-element tables as a function of the output characteristic data and the positional data being varied. Also included in the program is a color allocating unit which allocates the modified color component values to each corresponding one of the discrete elements and combines the modified color component values to the object color component values of each discrete element to thereby realize the updated color distribution over the entire array of the discrete elements. Further, an image producing unit is included to process the updated color distribution for rendering the view of three-dimensional illuminated scene of the object, and generating the image signal for presenting the view on the display.

Preferably, the re-calculation unit includes an filter that retrieves the output characteristic data and the positional data of the lighting fixtures selected at the lamp setting interface, and determines which one or ones of the discrete elements are assigned to have the lamp color components values each of a sufficient level above a threshold, and defines thus determined discrete elements as active elements. Thus, the filter enables to refer to the lamp-by-element tables only associated with the active elements The image producing unit is preferred to include a viewpoint selector which provides multiple viewpoints for the three-dimensional illuminated scene of the object, and selects anyone of the viewpoints in generating the image signal for presenting the view on the display. This feature can give enhanced preview capability for examining the lighting effect of the object.

Further, the image producing unit may be designed to produce the view of the three-dimensional illuminated scene of the object each time the re-calculating means operates to modify the lamp color component values, and to generate the image signals in succession for presenting the views as a movie.

In this connection, the system may include a raster memory that records the series of the image signals for replaying the movie for easy confirmation of the lighting effect.

The system may further include a fixture having a control output interface for connection with the actual lighting fixtures. The control output interface processes the image signals recorded in the raster memory to generate a control signal for actuating the lighting fixtures in coincidence with the changes made for at least one of the output characteristic data and the positional data of the lighting fixtures. With this result, it is easy to control the actual lighting fixtures in exact harmony with the simulated lighting sequence.

Preferably, the system may include a lighting data input interface for receiving a control input which selects one or more of the lighting fixture, and describes a lighting schedule indicating a time-series of changes intended for at least one of the output characteristic data and the positional data of the selected lighting fixture. The lighting data input interface transmits the control input to the re-calculating unit for modifying the lamp color component values in accordance with the predetermined schedule of changes. With the inclusion of the light data input interface, it is easy to simulate and confirm the intended lighting schedule made at a dedicated lighting control board designed for controlling the lighting fixtures.

These and still other advantageous features of the present invention will be made apparent from the following description of the preferred embodiment of the present invention when taken in conjunction with the attached drawings.

BRIEF DESCRIPTION OF THE DRAWINGS

FIG. 6 is chart illustrating data structures of tables utilized in the above system;

BEST MODES FOR CARRYING OUT THE INVENTIONS

Figure 1:
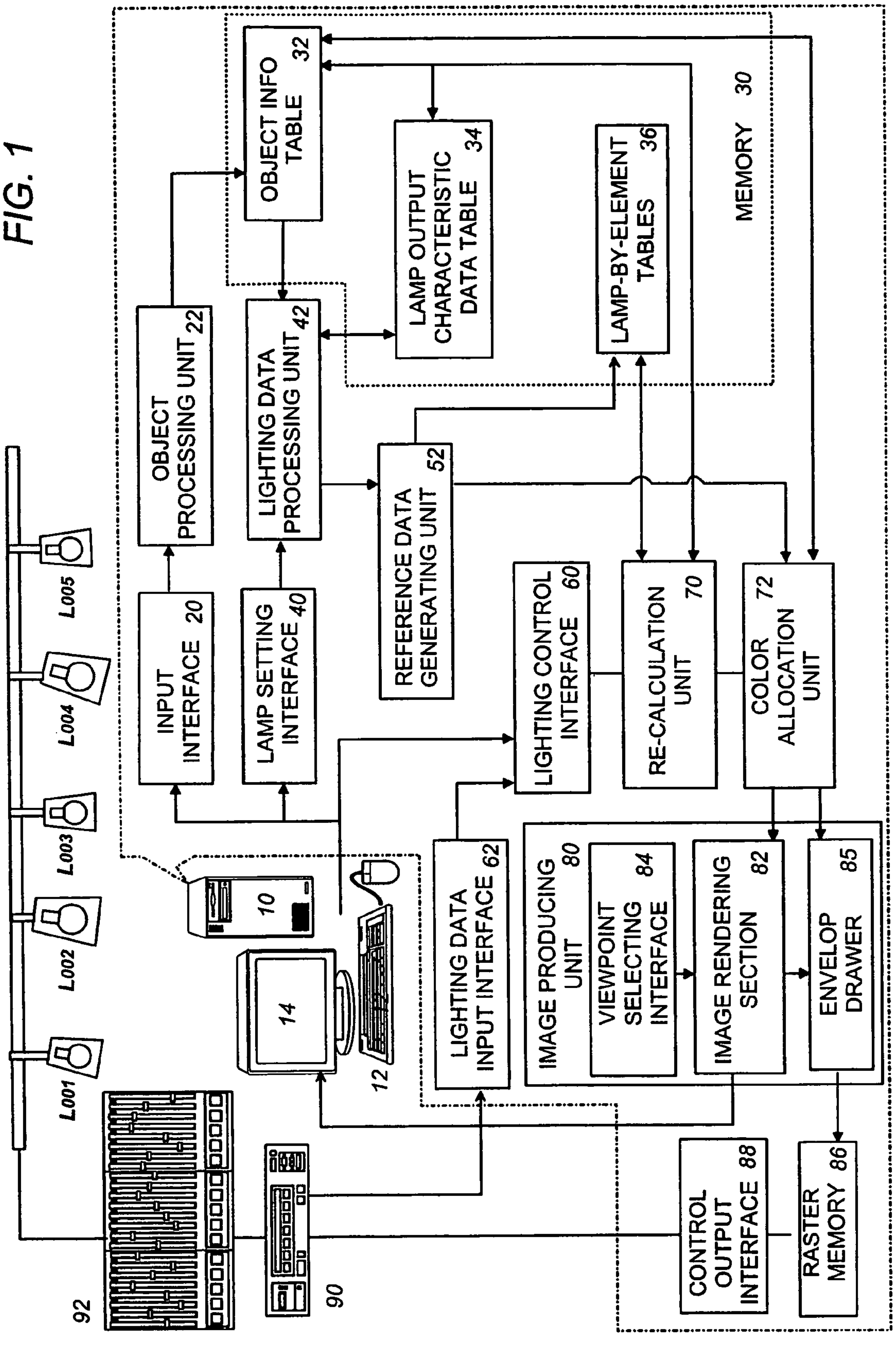
FIG. 1 is a block diagram of a simulation system in accordance with a preferred embodiment of the present invention.
Figure 4:
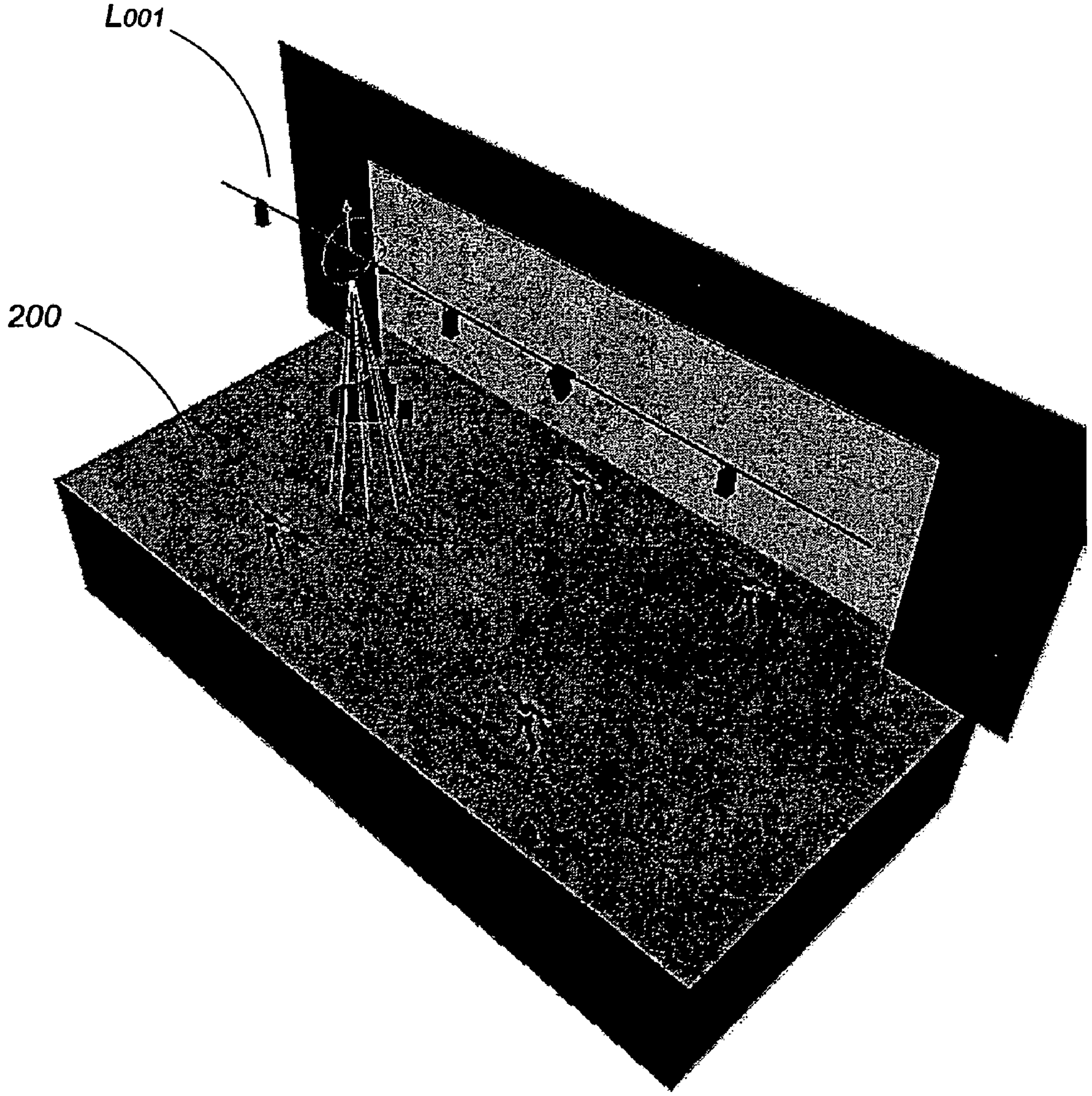
FIG. 4 is a perspective view of a three-dimensional object to be illuminated.

Referring now to FIG. 1, there is shown a simulation system in accordance with the present invention. The simulation system is made for creating a virtual three-dimensional scene illuminated with one or more lighting fixtures, and is adapted for, but not limited to, stage lighting with the use of multiple lighting fixtures. Although the illustrated embodiment explain the system with five (5) lighting fixtures or lamps $L_{001}$ to $L_{005}$ only for simplicity, the system should not interpreted to be limited to the number of the lighting fixtures. The system includes a computer 10 with an input device 12, and a display 14. The computer is programmed to give functional units and interfaces as illustrated in FIG. 1 for simulating the illuminated scene. An input interface 20 is included in the system to give object data describing a three-dimensional object 200, i.e., a stage configuration to be illuminated, as shown in FIG. 4. For this purpose, the input interface 20 is arranged to have a drawing capability of creating the three-dimensional object 200 step-by-step using the input device 12, i.e., keyboard and mouse. In addition, the input interface 20 may be designed to accept an image file to translate its content into the three-dimensional object of a suitable format to be processed in the system.

Figure 5:
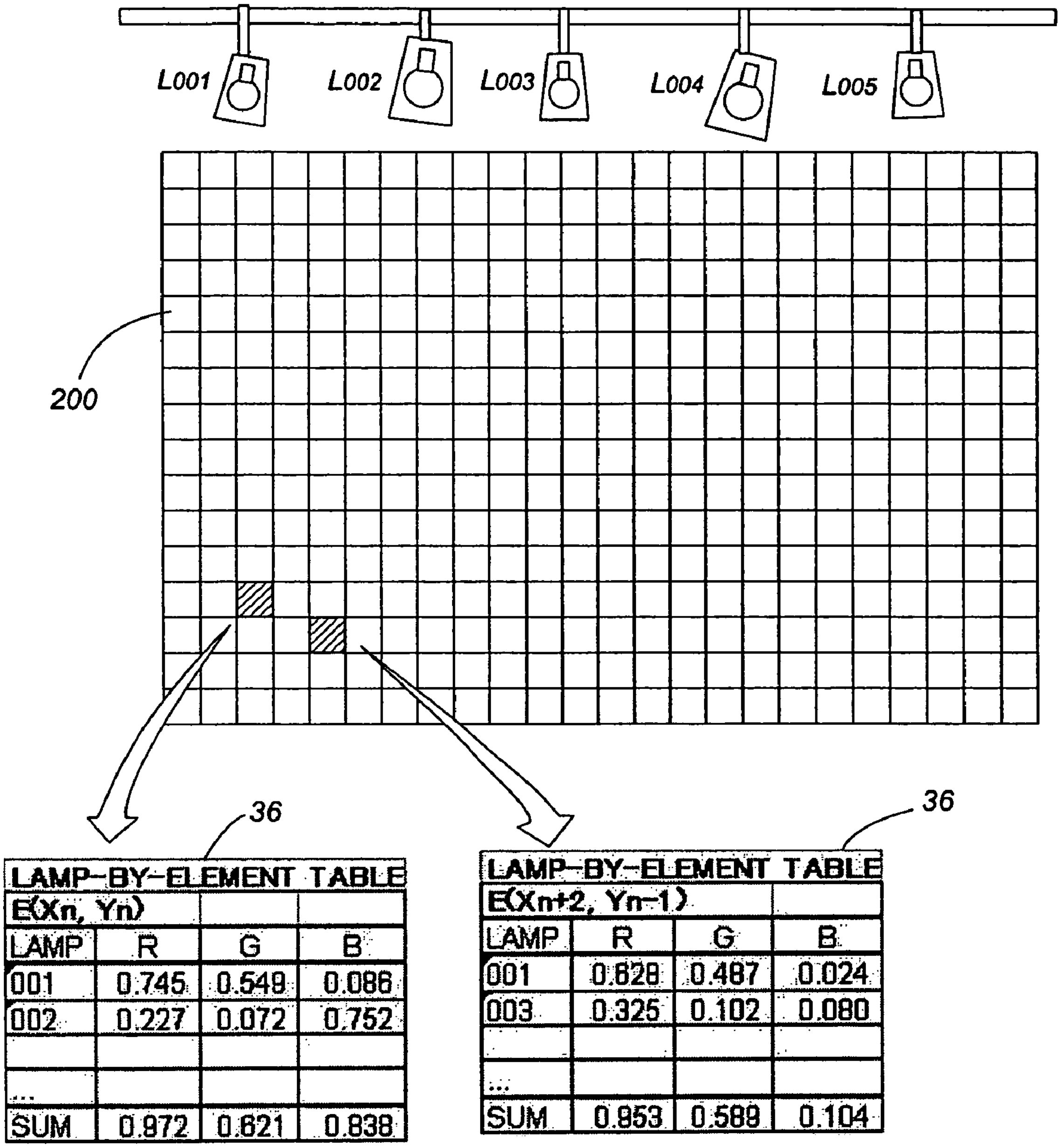
FIG. 5 is a chart illustrating the object divided into discrete elements and lamp-by-element tables assigned to each of the elements.

An object processing unit 22 is included to transform the thee-dimensional object 200 into an array of discrete elements, as shown in FIG. 5, and to obtain object color component values inherent to each discrete element. The object color component values denote intensities of individual color components, for example, R, G, and B components of a predetermined color space, and therefore are combined to specify the color of each discrete element. In the present embodiment, the object color component (R, G, B) value is set to be between zero (0) and (1), and a corresponding color is determined as a function of the individual color components (R, G, B). The object color component values for each discrete element are recorded together with coordinate of the element into an object-info table 32 that has a data structure shown in FIG. 6, and is loaded in a memory 30.

The system includes a lamp setting interface 40 for specifying one or more of the lighting fixtures utilized for illuminating the object and the position thereof within a space of the three-dimensional object. For this purpose, the lamp setting interface 40 is designed for prompting a user to select the lighting fixture by its identification code or name from those of preset ones. Associated with the lamp setting interface 40 is a lighting data processing unit 42 which fetches output characteristic data of the selected lighting fixture from an output characteristic data table 34 provided in the memory 30 and forward the data to-a reference data generating unit 52 for further processing. The output characteristic data table 34 stores the lamp component (R, G, B) values together with direction-dependent parameters for each of the lighting fixtures, as shown in FIG. 6. The direction-dependent parameters are defined, based upon the British Zonal Classification, to give a ratio (percentage) of the intensity (e.g., candela) of the light radiating to a particular point on the surface of a unit sphere from the center of the unit sphere where the lighting fixture is supposed to be located. The point on the surface of the unit sphere is represented by the latitude and longitude of the unit sphere. Thus, given the positional data of the lighting fixture within the space of the three-dimensional object, it is easy to calculate the lamp color component values of the light received at any point or element of the object from the selected lighting fixture. The calculation is made at the reference data generating unit 52 based upon the output of the lighting data processing unit 42. In short, the lighting data processing unit 42 fetches, from the lamp output characteristic data table 34, the output characteristic data of the selected lighting fixture, and passes the data together with the coordinates of each discrete element to the reference data generating unit 52.

Based upon the data from the unit 42, the reference data generating unit 52 calculates the lamp color component (R, G, B) values received at each discrete element of the object 200 from each of the selected lighting fixtures, and builds up a lamp-by-element table 36 for each of the discrete elements. Each of the lamp-by-element tables 36 lists the lamp color component (R, G, B) values of the individual lighting fixtures illuminating each corresponding discrete element, together with the summed component values, as shown in FIGS. 5 and 6. Each of the lamp color component values (Cp) is calculated by the following equation.

$$Cp = Lcd \cdot \cos\theta / r^2 \tag{1}$$

where Lcd is an intensity of the color component value in candela, cosθ is an inner product of a normal to the element and a vector from the lighting fixture to the element, and r is a distance between the lighting fixture and the discrete element. The color component value may be referred to as a color component power or energy for representing the magnitude of the color component.

It is noted in this connection that the reference data generating unit 52 designates the lighting fixture that gives the lamp color component values any one of which is greater than a predetermined threshold, such that each of the lamp-by-element tables 36 lists the identification code of only thus designated lighting fixture together with the lamp color component values. For this purpose, the reference data generating unit 52 has a filter which compares the lamp color component values of the selected lighting fixture reaching the discrete element with the respective thresholds and ignore the lighting fixture as a non-influencing fixture when all of its lamp color values are less than the corresponding thresholds. When the lighting fixture is determined for the particular discrete element to give the lamp color component values all of which are less than the corresponding thresholds, the particular discrete element is judged not to be influenced or illuminated by the lighting fixture and is given the lamp-by-element table 36 of null record. In this manner, the lamp-by-element table 36 is created for each discrete element. Thus obtained lamp-by-element tables 36 are combined to give reference data that defines an initial illuminated condition of the object, i.e., a color distribution over the entire array of the elements in combination with the object color component values stored in the object info table 32, in the same fashion as will be discussed later with reference to a color allocation unit 72 and an image producing unit 80.

A lighting control interface 60 is included in the system to receive an instruction selecting the lighting fixture and the associated changes in the output characteristic data and/or the position data. The lighting control interface 60 provides a form on the display 14 that prompts the user to enter the instruction through the keyboard and/or the mouse for specifying the lighting control intended by the user. A time-series of instructions are entered to give a lighting control schedule for changing the output characteristic data and/or positional data with respect to time for simulation of varying-lighting effect on the object. Such lighting control schedule may be recorded in a suitable format in an external recorder 90 and is transmitted therefrom as a control input through a lighting data input interface 62 to the lighting control interface 60. The lighting control schedule may be given from a dedicated lighting control board 92 which is provided for actuating the lighting fixtures L001 to L005.

Each time the instruction is given, a re-calculation unit 70 responds to fetch the output characteristic data and the positional data of the selected lighting fixture from the lamp output characteristic data table 34 and the object info table 32, to determine which one or ones of the discrete elements are influenced by the selected lighting fixture. That is, the particular discrete element is determined to be influenced or illuminated by the selected lighting fixture when any one of the lamp color component values received at that discrete element exceeds the corresponding threshold. Hereinafter, the particular discrete elements thus determined to be influenced by the particular lighting fixture are referred to simple as the active elements, and the lighting fixture assigned thereto is referred to simply as the influencing fixture, whenever it is deemed appropriate.

Then, the re-calculation unit 70 refers only to the lamp-by-element tables 36 associated with the active elements, and modifies the lamp color component values as a function of the output characteristic data and the positional data. The modification is made by using the above equation (1) for each of the color component (R, G, B) values. Thus, the re-calculation unit 70 refers the lamp-by-element tables 36 only associated with the active elements and make an arithmetic operation of modifying the color component values only related to the influencing fixture and gives the sum of each color component value of the individual active fixtures.

For instance, when the particular lighting fixture is controlled to move or change its projection angle, the re-calculation unit 70 firstly determines the active elements to be illuminated by the lighting fixture, i.e., the influencing fixture with reference to the object info table 32 and the lamp output characteristic data table 34, and at the same time determines inactive elements which are no longer illuminated by this particular lighting fixture. Then, the re-calculation unit 70 refers to the lamp-by-element tables 36 only associated with the active elements in order to modify the lamp color component values in the record relating to the influencing fixture, and at the same time refers to the same tables 36 only associated with the inactive elements to modify or nullify the record relating to the influencing fixture. When the particular lighting fixture is added, the re-calculation unit 70 determines the active elements to be illuminated by the lighting fixture, and refers to the lamp-by-element tables 36 only associated with the active elements in order to add the record in each of the tables 36 indicative of the identifying code of the influencing fixture together with the lamp color component values specific to each of the target elements. When the particular lighting fixture is deleted, the re-calculation unit 70 determines the inactive elements, and refers to the lamp-by-element tables 36 only associated with the inactive elements to thereby nullify the records in the tables relating to this lighting fixture. For the purpose of giving consistent and concise explanation of the essence of the present invention throughout the description and claims, the terms “modify” is used with reference to the color component values to encompass the usual meanings of “add” or “nullify”.

The sum of each color component value thus obtained for each of the lamp-by-element tables 36 is then fed to a color allocation unit 72 which refers to the object info table 32 and combines the sum with the object color component value for each corresponding one of the active element to give a color code indicating the color of the discrete element. For example, the color code is obtained by using the following know RGB function.

color code=RGB(exp1, exp2, exp3)

where exp1 is a red color component value multiplied by 255, exp2 is a green color component value multiplied by 255, and exp3 is a blue color component value multiplied by 255.

Then, the color allocation unit 72 gives an updated color distribution over the entire array of the discrete elements and transfers the same to an image processing unit 80. The image processing unit 80 includes an image rendering section 82 which processes the updated color distribution for rendering a view of three-dimensional illuminated scene of the object, and produces an image signal for representing the view on the display 14. The rendering is made based upon a suitable three-dimensional modeling technique already known in the art, and is not explained in detail. Included in the image processing unit 80 is a viewpoint selecting interface 84 for selecting one of various viewpoints and instructing the image rendering section 82 to give the image of the illuminated object from the selected viewpoint. The image signal of the view is continuously updated in accordance with the lighting control schedule to give a succession of the view, i.e., a dynamic image of the view on the display 14. At the same time, the image signal is accumulated as in a raster memory 86 to enable a playback function. Further, the system includes a control output interface 88 for connection with the external recorder 90 to record the image signal, and also with the lighting control board 92 in order to actuate the real lighting fixtures L001 to L005 in an exact manner as the simulation result.

Figure 2:
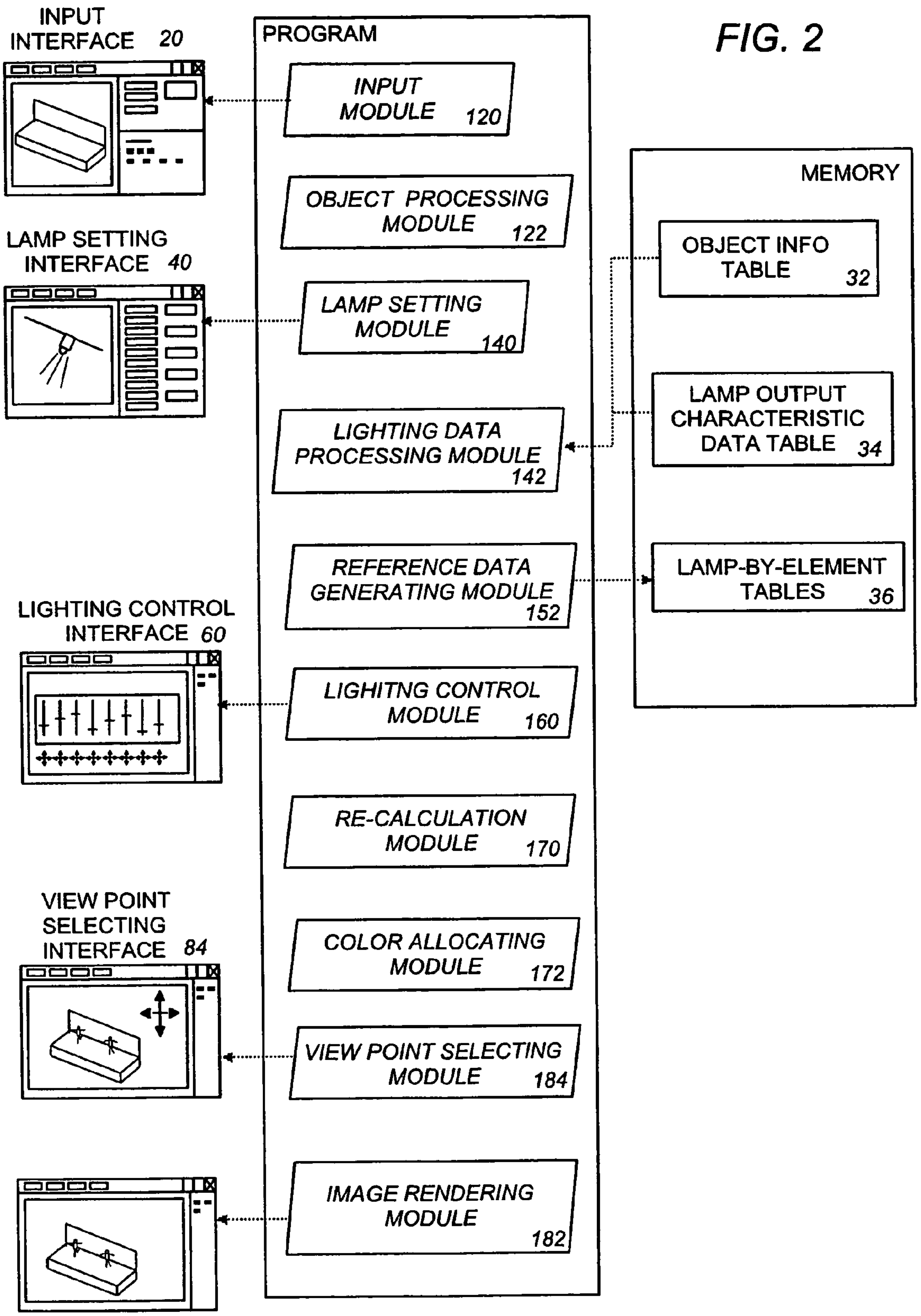
FIG. 2 is a block diagram illustrating a simulation program of the above embodiment.

FIG. 2 shows the structure of a program for achieving the above simulation. The program is written in one of state-of-art programming languages and is stored in a recordable medium such as a CD-ROM or the disk to be installed into and executed at the computer. The program is composed of various modules implementing the specific tasks as mentioned with reference to the system of FIG. 1. An input module 120 is provided to create the input interface 20 on the display 14 for prompting the user to enter the object data describing the three-dimensional object 200, as shown in FIG. 4. An object processing module 122 is provided to realize the object processing unit 22 for processing the object to create the object info table 32. A lamp setting module 140 is provided to create the lamp setting interface 40, while a lighting data processing module 142 realizes the lighting processing unit 42 which gathers the output characteristic data and the positional data of the selected lighting fixture from the lamp output characteristic data table 34 provided in the memory 30, in addition to the coordinates of the discrete elements from the object info table 32. A reference data generating module 152 is provided to realize the reference data generating unit 52 for building up the lamp-by-element tables 36. A lighting control module 160 provides the lighting control interface 60 which prompts the user to set the lighting control schedule for simulating the effect of illuminating the object. A re-calculation module 170 realizes the re-calculation unit 170 to modify the lamp color component values for the active elements with respect to the influencing fixture and to sum the lamp color component values from all of the influencing fixtures. A color allocation module 172 realizes the color allocation unit 72 to obtain the updated color distribution which is processed at an image rendering module 182 which realizes the image rendering section 82 to produce the image signal. A viewpoint selecting module 184 is also included to create the viewpoint selecting interface 84 for giving the view of the resulting illuminated object from the selected viewpoint.

Figure 3:
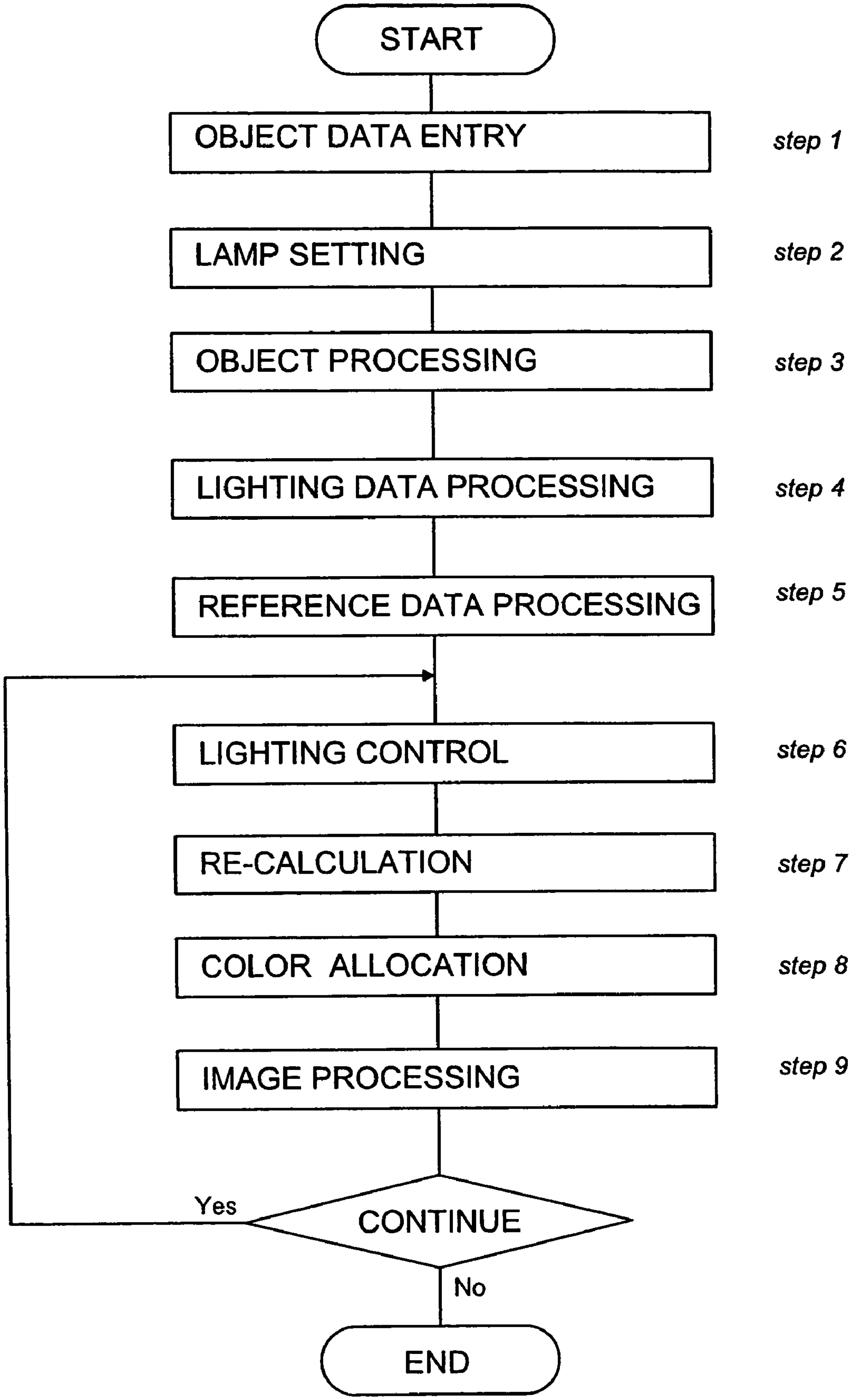
FIG. 3 a flow chart illustrating the operation of the above system.
Figure 7:
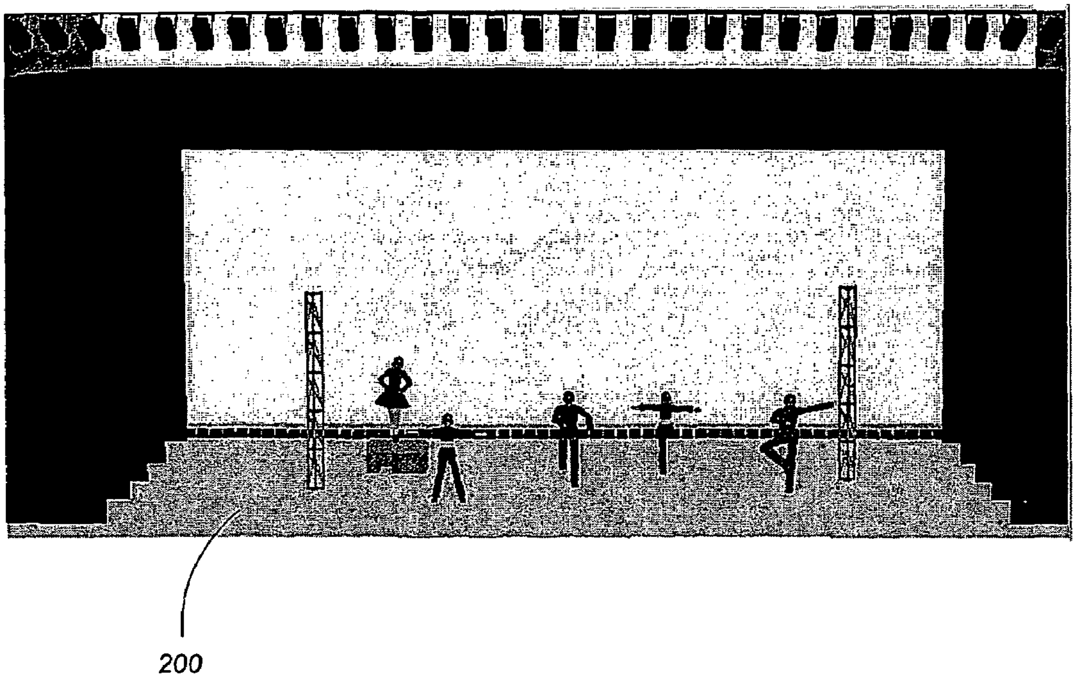
FIGS. 7 and 8 are perspective view of the simulated scenes respectively with differently lighting conditions.
Figure 8:
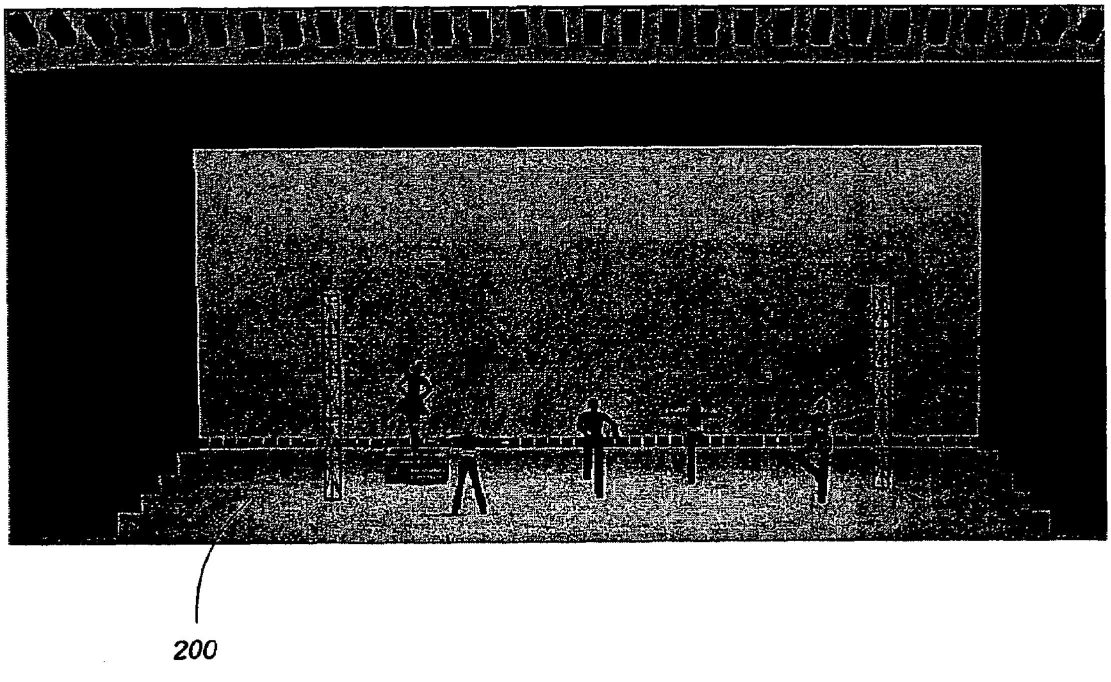

The operation of the above system and program will be explained again in brief with reference to a flow chart of FIG. 3. After the object data entry and lamp setting are completed (steps 1 and 2), the object processing and the lighting data processing are made to obtain information about the coordinates of the discrete elements of the object together with the output characteristic data and positional data of the selected lighting fixture (steps 3 and 4). Then, the reference data processing is made to allocate the lamp color component values to each discrete element, building up the lamp-by-element tables 36 with respect to each of the discrete elements, as shown in FIG. 5, and combining the lamp color component values with the object color component values to realize the reference or initial view of the illuminated scene, as shown in FIG. 7. The initial view is then continuously updated, as shown in FIG. 8, to give the simulated dynamic image by repeating a loop of making the lighting control, the re-calculation of the lamp color component values, the color allocation, and the image processing (steps 6 to 9). By comparison between the views of FIGS. 7 and 8, the changing illumination effect is appreciated by the changing brightness of the portions of the object, although the actual image is represented in colors.

Figure 9:
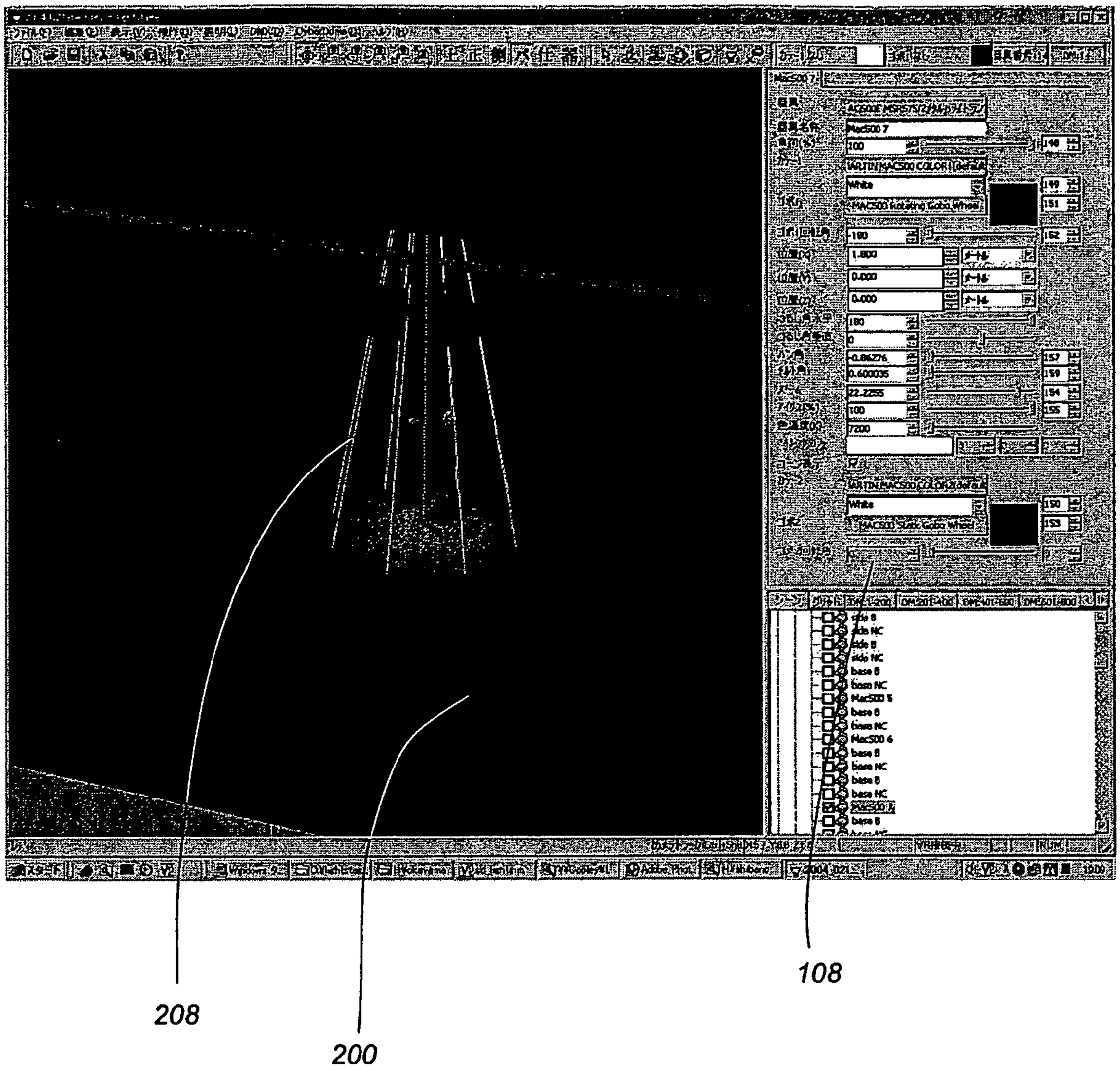
FIG. 9 is a view illustrating a simulated image on a display of the above system.

The system of the present invention further includes an envelop drawer 85 which determines a projection cone of the light beam emanating from each of the selected lighting fixture by referring to the output characteristic data and the positional data of the lighting fixture, in addition to the coordinates of the active elements, and draws the envelop 208 of the projection cone, either by lines or shades for adding visual emphasis on the illumination effect of the object 200, as shown in FIG. 9. The envelop drawer 85 is also realized by a corresponding module of the program and gives a user interface 108 by which the user can selectively add the emphasis for each of the individual lighting fixtures.

The invention claimed is:

1. A simulation method for creating a virtual three-dimensional scene illuminated with at least one lighting fixture, said method comprising the steps of:

a) obtaining an object data with regard to a three-dimensional object to be illuminated with said lighting fixture;

b) specifying said lighting fixture and determining a position of said lighting fixture within a space of said three-dimensional object, in order to obtain output characteristic data as well as positional data of said lighting fixture;

c) transforming said object data into an array of discrete elements and obtaining object color component values inherent to each discrete element, said object color component values being assigned to respective color components in a predetermined color space for designating the color of each discrete element;

d) processing said object data, and said output characteristic data as well as said positional data of said lighting fixture in order to obtain lamp color component values given to each of said discrete elements, said lamp component values being assigned to the respective color components in said color space for designating the color of said lighting fixture illuminating each destined one of the discrete elements, e) providing a plurality of lamp-by-element tables each associated with each of said discrete elements, each of said lamp-by-element table storing the lamp color component values;

f) varying at least one of said output characteristic data and said positional data of said lighting fixture;

g) determining the discrete elements to be illuminated by said lighting fixture;

h) referring to said lamp-by-element tables only associated with thus determined discrete elements and modifying the lamp color component value stored in the referred lamp-by-element tables as a function of said output characteristic data and said positional data being varied;

i) allocating said modified color component values to each of the corresponding discrete elements and combining the modified color component values to said object color component values of each discrete element to realize an updated color distribution over the entire array of said discrete elements; and j) processing said updated color distribution for rendering a view of three-dimensional illuminated scene of said object; and wherein two or more lighting fixtures are selected and specified with respect to said output-characteristic data as well as said positional data, said method including the steps of: (i) selecting two or more lighting fixture as variable components, and varying at least one of said output characteristic data and said positional data of said lighting fixtures to determined the discrete elements to be illuminated by said lighting fixtures selected as the variable components; (ii) referring to said lamp-by-element tables only associated with thus determined discrete elements and modifying the lamp color component values stored in the referred lamp-by-elements tables for said lighting fixtures; (iii) summing the lamp color component values in each of the referred lamp-by-element table to give summed lamp color components values associated with each said discrete element, and allocating the summed lamp color component values to said discrete elements, thereby realizing the updated color distribution over the array of the discrete elements.

2. A computer readable medium having a computer program stored thereon for creating a virtual three-dimensional scene illuminated with multiple lighting fixtures comprising:

a) an input module which provides an input interface for entry of an object data with regard to a three-dimensional object to be illuminated with said lighting fixtures;

b) a lamp setting module which provides a lamp setting interface for selecting one or more said lighting fixtures and determining position of said selected lighting fixtures within a space of said three-dimensional object, c) a lighting data processing module which gives output characteristic data and positional data of said selected lighting fixtures in response to the selection of said lighting fixture and the position thereof received at said lamp setting interface;

d) an object processing module which transforming said object data into an array of discrete elements, and which obtains object color component values inherent to each discrete element, said object color component values being assigned to respective color components in a predetermined color space for designating the color of each discrete element;

e) a reference data generating module which calculates said object data, and said output characteristic data as well as said positional data of each of said selected lighting fixtures in order to obtain lamp color component values given to each of said discrete elements, said lamp component values being assigned to the respective color components in said color space for designating the color of said lighting fixture illuminating each destined one of the discrete elements, said reference data generating module providing a plurality of lamp-by-element tables each corresponding to each one of said discrete elements and storing the lamp color component values;

f) a lighting control module which provides a lighting control interface for selecting at least one of said lighting fixtures and selecting changes in at least one of said output characteristic data and said positional data of the lighting fixture;

g) a re-calculation module which determines the discrete elements to be illuminated by said at least one lighting fixture, and refers to said lamp-by-element tables only associated with thus determined discrete elements, said re-calculation module modifying the lamp color component values stored in the referred lamp-element tables as a function of said output characteristic data and said positional data being varied;

h) a color allocating module which allocates said modified color component values to each corresponding one of said discrete elements and combines the modified color component values to said object color component values of each discrete element to thereby realize a an updated color distribution over the entire array of said discrete elements, i) an image producing module which processes said updated color distribution for rendering a view of three-dimensional illuminated scene of said object, and generating an image signal for presenting said view on a display; said lighting control module further providing for selecting two or more lighting fixture as variable components, and varying at least one of said output characteristic data and said positional data of said lighting fixtures to determined the discrete elements to be illuminated by said lighting fixtures selected as the variable components; said re-calculation module further referring to said lamp-by-element tables only associated with thus determined discrete elements and modifying the lamp color component values stored in the referred lamp-by-elements tables for said lighting fixtures; said color allocating module further summing the lamp color component values in each of the referred lamp-by-element table to give summed lamp color components values associated with each said discrete element, and allocating the summed lamp color component values to said discrete elements, thereby realizing the updated color distribution over the array of the discrete elements.

3. A simulation system for creating a virtual three-dimensional scene illuminated with one or more lighting fixtures, said system comprising:

a) an input interface for entry of an object data with regard to a three-dimensional object to be illuminated with said lighting fixtures;

b) a lamp setting interface for selecting one or more said lighting fixtures and for determining position of said selected lighting fixtures within a space of said three-dimensional object, c) a lighting data processing unit which gives output characteristic data and positional data of said selected lighting fixtures in response to the selection of said lighting fixture and the position thereof received at said lamp setting interface;

d) an object processing unit which transforms said object data into an array of discrete elements, and which obtains object color component values inherent to each discrete element, said object color component values being assigned to respective color components in a predetermined color space for designating the color of each discrete element;

e) a reference data generating unit which calculates said object data, and said output characteristic data as well as said positional data of each of said selected lighting fixtures in order to obtain lamp color component values given to each of said discrete elements, said lamp component values being assigned to the respective color components in said color space for designating the color of said lighting fixture illuminating each destined one of the destined discrete elements, f) a memory providing a plurality of lamp-by-element tables each corresponding to each one of said discrete elements and storing the lamp color component values;

g) a lighting control interface for selecting at least one of said lighting fixtures and selecting changes in at least one of said output characteristic data and said positional data of the lighting fixture;

h) a re-calculation unit which determines the discrete elements to be illuminated by said at least one lighting fixture, and refers to said lamp-by-element tables only associated with thus determined discrete elements, said re-calculation unit modifying the lamp color component values stored in the referred lamp-element tables as a function of said output characteristic data and said positional data being varied;

i) a color allocating unit which allocates said modified color component values to each corresponding one of said discrete elements and combines the modified color component values to said object color component values of each discrete element to thereby realize a an updated color distribution over the entire array of said discrete elements, and j) an image producing unit which processes said updated color distribution for rendering a view of three-dimensional illuminated scene of said object, and generating an image signal for presenting said view on a display; said lighting control unit further providing for selecting two or more lighting fixture as variable components, and varying at least one of said output characteristic data and said positional data of said lighting fixtures to determined the discrete elements to be illuminated by said lighting fixtures selected as the variable components; said re-calculation unit further referring to said lamp-by-element tables only associated with thus determined discrete elements and modifying the lamp color component values stored in the referred lamp-by-elements tables for said lighting fixtures; said color allocating unit further summing the lamp color component values in each of the referred lamp-by-element table to give summed lamp color components values associated with each said discrete element, and allocating the summed lamp color component values to said discrete elements, thereby realizing the updated color distribution over the array of the discrete elements.

4. The system as set forth in claim 3, wherein said re-calculation unit includes a filter that retrieves the output characteristic data and said positional data of the lighting fixtures selected at said lamp setting interface, and determines which one or ones of said discrete elements are assigned to have the lamp color components values each of a sufficient level above a threshold, and defining thus determined discrete elements as active elements, said filter enabling said re-calculation unit to refer to said lamp-by-element tables only associated with the active elements.

5. The system as set forth in claim 3, wherein said image producing unit includes a viewpoint selector which provides multiple viewpoints for said three-dimensional illuminated scene of said object, and selects anyone of said viewpoints in generating said image signal for presenting said view on the display.

6. The system as set forth in claim 5, further including a raster memory that records the series of said image signals for replaying said movie.

7. The system as set forth in claim 6, further including a control output interface for connection with the actual lighting fixtures, said control output interface processing said image signals recorded in said raster memory to generate a control signal for actuating the lighting fixtures in coincidence with the changes made for at least one of said output characteristic data and said positional data of said lighting fixtures selected at said lighting control interface.

8. The system as set forth in claim 3, wherein said image producing unit produces the view of the three-dimensional illuminated scene of said object each time said re-calculating means operates to modify the lamp color component values, and generates the image signals in succession for presenting said views as a movie.

9. The system as set forth in claim 3, further including a lighting data input interface for receiving a control input which selects one or more of said lighting fixture, and describes a lighting schedule indicating a time-series of changes intended for at least one of said output characteristic data and said positional data of the selected lighting fixture, said data input interface transmitting said control input to said re-calculating unit for modifying the lamp color component values in accordance with the lighting schedule.

* * * * *